United States Patent
Kantany et al.

(10) Patent No.: US 11,939,924 B2
(45) Date of Patent: Mar. 26, 2024

(54) SYNCHRONIZED AIR MODULATING SYSTEM

(71) Applicant: Raytheon Technologies Corporation, Farmington, CT (US)

(72) Inventors: Nicholas W. Kantany, Manchester, CT (US); Edward Boucher, Avon, CT (US); Kristine Marie Carnavos, Providence, RI (US); Robert Russell Mayer, Manchester, CT (US); Donald W. Peters, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/958,682

(22) Filed: Oct. 3, 2022

(65) Prior Publication Data

US 2023/0029935 A1 Feb. 2, 2023

Related U.S. Application Data

(62) Division of application No. 16/431,955, filed on Jun. 5, 2019, now Pat. No. 11,492,977, which is a division (Continued)

(51) Int. Cl.
*F02C 7/28* (2006.01)
*F02C 9/20* (2006.01)
(Continued)

(52) U.S. Cl.
CPC .............. *F02C 7/28* (2013.01); *F02C 9/20* (2013.01); *F02K 3/075* (2013.01); *F02K 3/115* (2013.01)

(58) Field of Classification Search
CPC .... F02C 7/28; F02C 9/20; F03K 3/075; F03K 3/115; F01D 17/00; F01D 17/105; F01D 17/145; F04D 27/0215
See application file for complete search history.

(56) References Cited

U.S. PATENT DOCUMENTS 1,205,130 A 11/1916 Westinghouse
2,553,645 A 5/1951 Ferro, Jr.
(Continued)

FOREIGN PATENT DOCUMENTS

DE 3007601 9/1981
EP 0567277 10/1993
(Continued)

OTHER PUBLICATIONS

European Patent Office, European Search Report dated Mar. 4, 2016 in Application No. 15179139.9.

(Continued)

*Primary Examiner* — Sabbir Hasan
(74) *Attorney, Agent, or Firm* — SNELL & WILMER L.L.P.

(57) ABSTRACT

A system for modulating air flow in a gas turbine engine is provided. The system may include a seal wall comprising an opening, a seal door configured to slideably engage the seal wall, and an actuator configured to move the seal door over the opening. In various embodiments, the system may include a surface forward of the seal door. The seal door may be configured to seal a passage through the surface and the opening of the seal wall. A track may be disposed under the seal door. The track may comprise cobalt. Rollers may be coupled to the seal door with the rollers on the track. The seal door may comprise a nickel-chromium alloy. A sync ring may be coupled to the seal door. The actuator may be coupled through the sync ring to the seal door.

7 Claims, 17 Drawing Sheets

Related U.S. Application Data of application No. 14/812,926, filed on Jul. 29, 2015, now Pat. No. 10,352,248.

(60) Provisional application No. 62/078,565, filed on Nov. 12, 2014, provisional application No. 62/058,486, filed on Oct. 1, 2014.

(51) Int. Cl.
*F02K 3/075* (2006.01)
*F02K 3/115* (2006.01)

(56) References Cited

U.S. PATENT DOCUMENTS

| | | | |
|---|---|---|---|
| 2,952,437 A | 9/1960 | Knox | |
| 3,109,457 A | 11/1963 | Oliveau | |
| 4,294,427 A | 10/1981 | Cilny | |
| 4,463,552 A | 8/1984 | Monhardt et al. | |
| 4,546,605 A | 10/1985 | Mortimer et al. | |
| 4,827,713 A | 5/1989 | Peterson et al. | |
| 5,347,807 A * | 9/1994 | Brossier | F02K 3/075 60/225 |
| 5,417,083 A | 5/1995 | Eber | |
| 6,086,326 A * | 7/2000 | Honda | F16C 13/006 60/785 |
| 6,370,772 B1 * | 4/2002 | Honda | F01D 17/141 29/898 |
| 6,561,483 B2 | 5/2003 | Nakagawa | |
| 7,861,535 B2 | 1/2011 | Figueroa et al. | |
| 7,886,520 B2 | 2/2011 | Stretton et al. | |
| 8,051,737 B2 | 11/2011 | Li | |
| 8,550,430 B2 | 10/2013 | Lamprecht et al. | |
| 8,739,812 B2 | 6/2014 | Brandon-Jones et al. | |
| 9,163,524 B2 | 10/2015 | Moore et al. | |
| 9,488,281 B2 | 11/2016 | Howes | |
| 2011/0173984 A1 | 7/2011 | Valeev et al. | |
| 2011/0232790 A1 | 9/2011 | Brandon-Jones et al. | |
| 2013/0140790 A1 | 6/2013 | Gladwin | |
| 2013/0259640 A1 * | 10/2013 | Dimascio | F01D 11/18 415/1 |
| 2013/0343866 A1 | 12/2013 | Christians | |
| 2014/0230246 A1 | 8/2014 | McMahon et al. | |
| 2014/0239084 A1 | 8/2014 | Chandler et al. | |
| 2015/0204450 A1 | 7/2015 | Tuccelli et al. | |

FOREIGN PATENT DOCUMENTS

| | | |
|---|---|---|
| EP | 0576354 | 12/1993 |
| EP | 0939230 | 9/1999 |
| EP | 1348835 | 10/2003 |
| EP | 2157305 | 2/2010 |
| EP | 2431599 | 3/2012 |
| EP | 2540990 | 1/2013 |
| FR | 2597157 | 10/1987 |
| WO | 2004104377 | 12/2004 |
| WO | 2013124616 | 8/2013 |
| WO | 2013191798 | 12/2013 |
| WO | 2014052842 | 4/2014 |

OTHER PUBLICATIONS

European Patent Office, European Search Report dated May 3, 2016 in European Application No. 15179429.4.
USPTO, Non-Final Office Action dated Mar. 23, 2017 in U.S. Appl. No. 14/630,228.
USPTO; Restriction Requirement Office Action dated Aug. 10, 2017 in U.S. Appl. No. 14/812,926.
USPTO, Notice of Allowance dated Aug. 30, 2017 in U.S. Appl. No. 14/630,228.
USPTO; Non-Final Office Action dated Nov. 17, 2017 in U.S. Appl. No. 14/812,926.
USPTO; Final Office Action dated Apr. 5, 2018 in U.S. Appl. No. 14/812,926.
USPTO; Advisory Action dated Jun. 20, 2018 in U.S. Appl. No. 14/812,926.
USPTO; Non-Final Office Action dated Jul. 13, 2018 in U.S. Appl. No. 14/812,926.
USPTO; Final Office Action dated Sep. 27, 2018 in U.S. Appl. No. 14/812,926.
USPTO; Advisory Action dated Dec. 13, 2018 in U.S. Appl. No. 14/812,926.
USPTO; Notice of Allowance dated Mar. 25, 2019 in U.S. Appl. No. 14/812,926.
USPTO; Requirement for Restrictions dated Feb. 18, 2021 in U.S. Appl. No. 16/431,955.
USPTO; Non-Final Office Action dated Apr. 29, 2021 in U.S. Appl. No. 16/431,955.
European Patent Office, European Search Report dated Mar. 16, 2021 in Application No. 20205206.4.
USPTO; Office Action dated Jan. 21, 2022 in U.S. Appl. No. 16/431,955.
USPTO; Advisory Action dated Apr. 8, 2022 in U.S. Appl. No. 16/431,955.
USPTO; Notice of Allowance dated Jul. 8, 2022 in U.S. Appl. No. 16/431,955.
European Patent Office, European Office Action dated Jun. 1, 2018 in European Application No. 15179429.4.
European Patent Office, European Office Action dated Jun. 28, 2023 in Application No. 20205206.4.

* cited by examiner

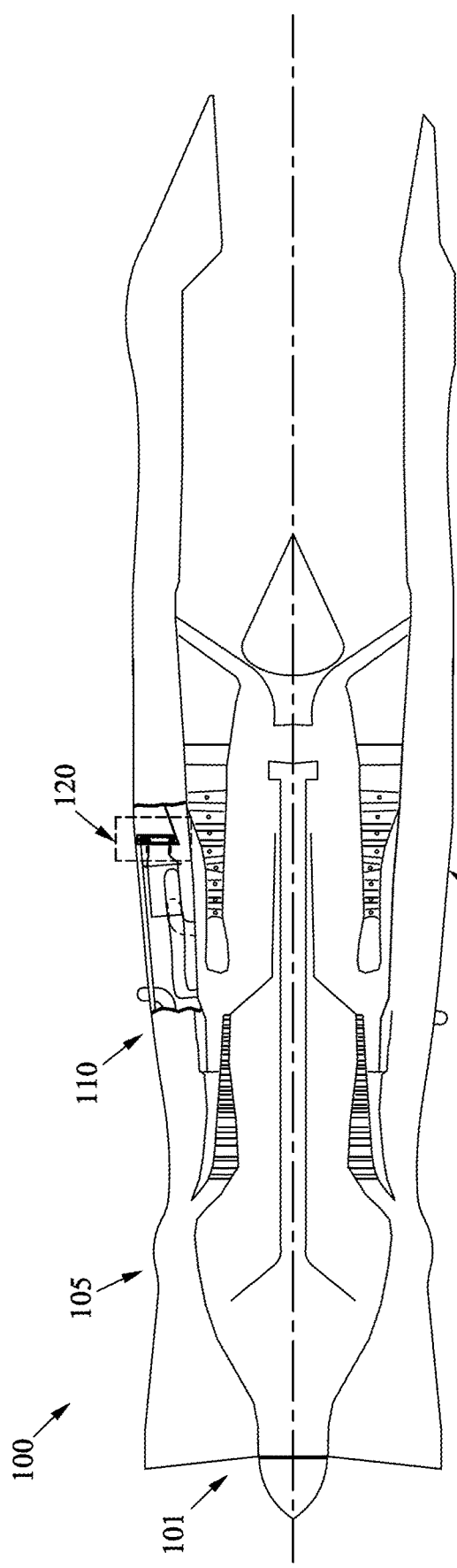
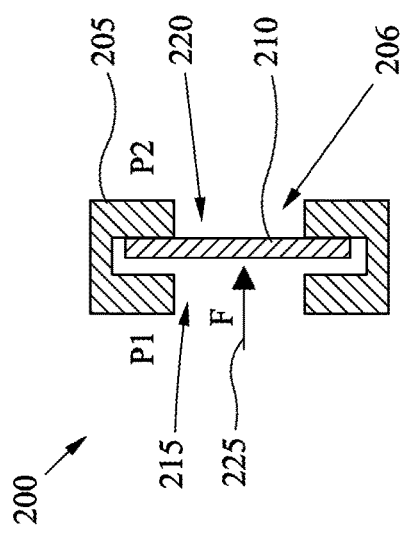
FIG. 1
FIG. 2

SYNCHRONIZED AIR MODULATING SYSTEM

CROSS-REFERENCE TO RELATED APPLICATIONS

This application is a divisional application of U.S. patent application Ser. No. 16/431,955, entitled "SYNCHRONIZED AIR MODULATING SYSTEM," filed Jun. 5, 2019. The '955 application is a divisional application of U.S. patent application Ser. No. 14/812,926, entitled "SYNCHRONIZED AIR MODULATING SYSTEM," filed Jul. 29, 2015, now U.S. Pat. No. 10,352,248. The '926 application claims priority to and the benefit of U.S. Prov. Appl. 62/058,486, entitled "SYNCHRONIZED AIR MODULATING SYSTEM," filed on Oct. 1, 2014, and U.S. Prov. Appl. 62/078,565, entitled "SYSTEM AND SEAL CONFIGURATIONS FOR AIR MODULATION OF A GAS TURBINE HEAT EXCHANGER," filed on Nov. 12, 2014, each of which is hereby incorporated by reference in its entirety.

GOVERNMENT LICENSE RIGHTS

This disclosure was made with government support under contract No. FA8650-09-D-2923-0021 awarded by the United States Air Force. The government has certain rights in the disclosure.

FIELD

The present disclosure relates to air flow modulation, and, more specifically, to a pressure loaded sealing system to control a pressure driven flow system.

BACKGROUND

Air flow control in gas turbine engines may be accomplished using various air flow control devices. Some applications may call for flow control devices that substantially stop all air flow when in a closed position. Current air flow control devices may have nontrivial leakage when closed. Thus, current air flow control devices may be unable to substantially close all air flow. Furthermore, current air flow control devices (e.g., butterfly valves) may also have non-linear flow control in response to the device opening or closing to a partially opened state.

SUMMARY

A system for modulating air flow in a gas turbine engine is provided. The system may include a seal wall comprising an opening, a seal door configured to slideably engage the seal wall, and an actuator configured to move the seal door over the opening.

In various embodiments, the system may include a surface forward of the seal door. The seal door may be configured to seal a passage through the surface and the opening of the seal wall. A track may be disposed under the seal door. The track may comprise cobalt. Rollers may be coupled to the seal door with the rollers on the track. The seal door may comprise a nickel-chromium alloy. A sync ring may be coupled to the seal door. The actuator may be coupled through the sync ring to the seal door.

In various embodiments, a seal may include a seal wall defining a passage and a seal door configured to slide over the passage. A ring may be coupled to the seal door. An actuator may be coupled to the ring. The seal door may comprise a nickel-chromium alloy. The ring may be a titanium alloy or a nickel-chromium alloy. The track may be coupled to the seal wall. The seal door may slideably engage the track and the seal wall. The track may be cobalt.

In various embodiments, a heat exchanger may comprise an exit port and a seal door configured to cover the exit port. A ring may be coupled to the seal door. A seal wall may be proximate the seal door. The seal wall may include a track to slideably engage the seal door. The seal wall may be mounted to the heat exchanger. The seal door may be made of a nickel-chromium alloy. An actuator may be coupled to the ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 1 depicts a graphical representation of a gas turbine engine, in accordance with various embodiments;

FIG. 2 depicts a graphical representation of an air modulating device, in accordance with various embodiments;

FIG. 10A illustrates a seal with a seal door in an open position, in accordance with various embodiments;

FIG. 10B illustrates a seal with a seal door in a partially closed position, in accordance with various embodiments;

DETAILED DESCRIPTION

Figure 3A:
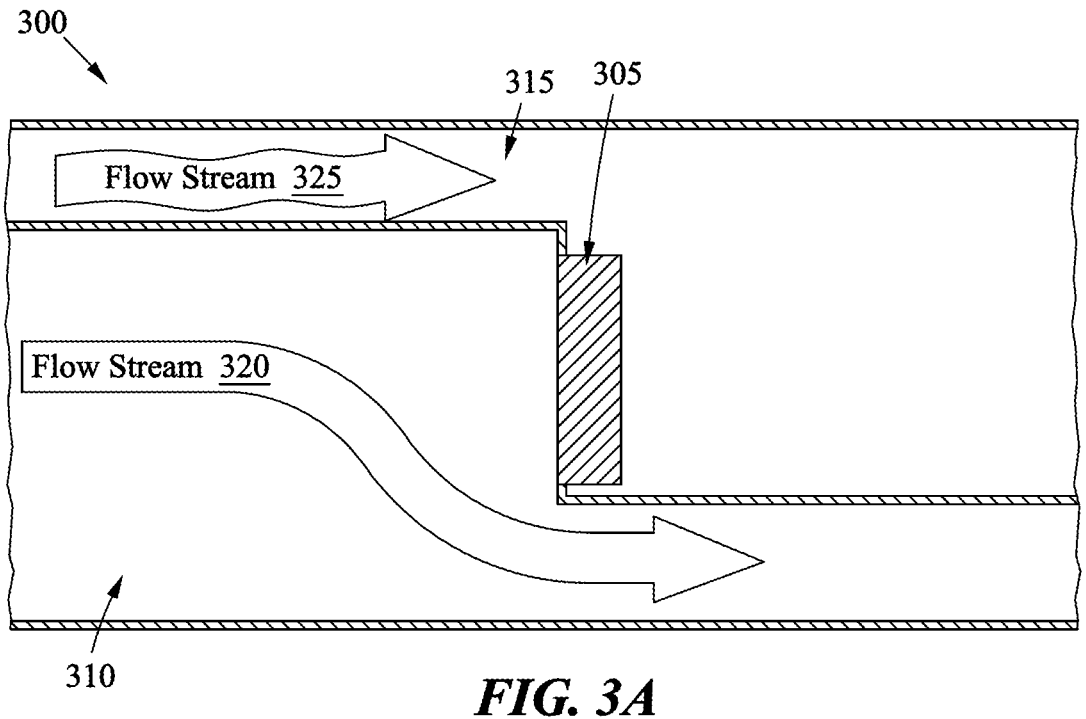
FIGS. 3A-3F depict graphical representations of air modulating system configurations with an air modulating device, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, air modulation relates to continuous control of air flow and/or pressure within conduits. Air modulation may also relate to continuous control of air flow and/or pressure for air flow streams of a gas turbine engine. In various embodiments, air modulation may be relative to a heat exchanger of a gas turbine engine.

An air modulating device may have a movable element configured to control air flow across a heat exchanger. The movable element may be configured to receive an air flow stream (e.g., secondary air flow, or by-pass air flow, etc.), associated with a particular conduit and/or air flow path of a gas turbine engine. The movable element may also control pressure of air applied to another conduit or air flow stream.

One or more sealing configurations are provided for a movable element that may be positioned by a drive element for one or more of sealing a port and modulating air flow. A system comprising the movable element may allow for synchronization of air modulating devices for a plurality of heat exchangers of a gas turbine engine. The plurality of air modulation devices may be controlled by one or more actuators.

With reference to FIG. 1, a graphical representation of a gas turbine engine is shown according to various embodiments. Gas turbine engine 100 may include a fan section 101, compressor section 105, combustion section 110 and turbine section 115. In various embodiments, gas turbine engine 100 may include an air modulating system 120.

In various embodiments, air modulation system 120 may include one or more air modulating devices to control air flow and/or air pressure associated with one or more components of gas turbine engine 100. The control of air flow may be associated with a secondary stream or bypass air of the gas turbine engine 100. Air modulation system 120 may be positioned near a heat exchanger (not shown in FIG. 1) of gas turbine engine 100. In FIG. 1, air modulation system 120 is positioned down stream of combustion section 110 and near turbine section 115.

FIG. 2 illustrates a graphical representation of an air modulating device according to various embodiments. Air modulating device 200 may be part of an air modulation system, such as the air modulation system 120 of FIG. 1. FIG. 2 depicts an exemplary cross-sectional view of air modulating device 200. Air modulating device 200 may include structure 205 and movable element 210. Structure 205 may have port 206 (e.g., opening) to allow air flow from a first side 215 flow to a second side 220. The position of movable element 210 may seal port 206 of structure 205 to prevent air flow. Port 206 may be a passageway in the air modulating device 200.

In various embodiments, air flow may produce pressure (F) 225. Pressure 225 may aid in sealing movable element 210 to structure 205. Air modulating device 200 may be employed in a region where pressure on side 215 is greater than the pressure on side 220. Movable element 210 may be a plate element configured for sliding and/or rotational motion relative to port 206. Movable element 210 may be positioned to fully cover (e.g., seal) port 206, to fully open (e.g., uncover) port 206, and to one or more positions between fully open and fully closed. One or more sealing configurations may be provided herein for the air modulating device 200.

In various embodiments, air modulating device 200 may be controlled to modulate the air flow and control pressure from a first conduit to a second conduit (conduits not shown in FIG. 2). Similarly, air modulating device 200 may be controlled to modulate the air flow and control pressure relative to multiple streams (e.g., a first and second stream) and relative to a single air flow stream. As such, the first conduit and second conduit may be associated with the same airstream. Air modulating device 200 may be configured to receive air from a first conduit providing a first airstream and deposit the air back into the same airstream (e.g., first air stream).

In various embodiments, air modulating device 200 may be controlled to modulate air flow by continuously updating the position of movable element 210. Movable element 210 may be configured to control air flow across a heat exchanger and control pressure of first conduit and second conduits as will be discussed with reference to FIGS. 3A-3F. The sealing configurations of air modulating device 200 may provide continuous control of one or more movable elements, such as movable element 210, to control and modulate air flow relative to port 206. Air modulating device 200 may be configured as a gear drive element.

Air modulating device 200 may also allow for adjusting the pressure based on position of movable element 210. By way of example, flow that is caused by a pressure differential loads the movable element 210 to create sealing. Position of a movable element 210 of air modulating device 200 may be adjusted continuously to modulate the air flow. For example, air modulating device 200 may adjust the position of movable element 200 to any degree or percentage between an open and closed positions. Air modulating device 200 can operate as a single unit or can be synchronized with other air modulating devices.

FIGS. 3A-3F illustrate various air modulating system configurations with an air modulating device according to various embodiments. Although the description of FIGS. 3A-3F may refer to a first and second conduit, it should be appreciated that air modulating systems as discussed herein may be employed to air flow streams not tied to a particular conduit.

Figure 3B:
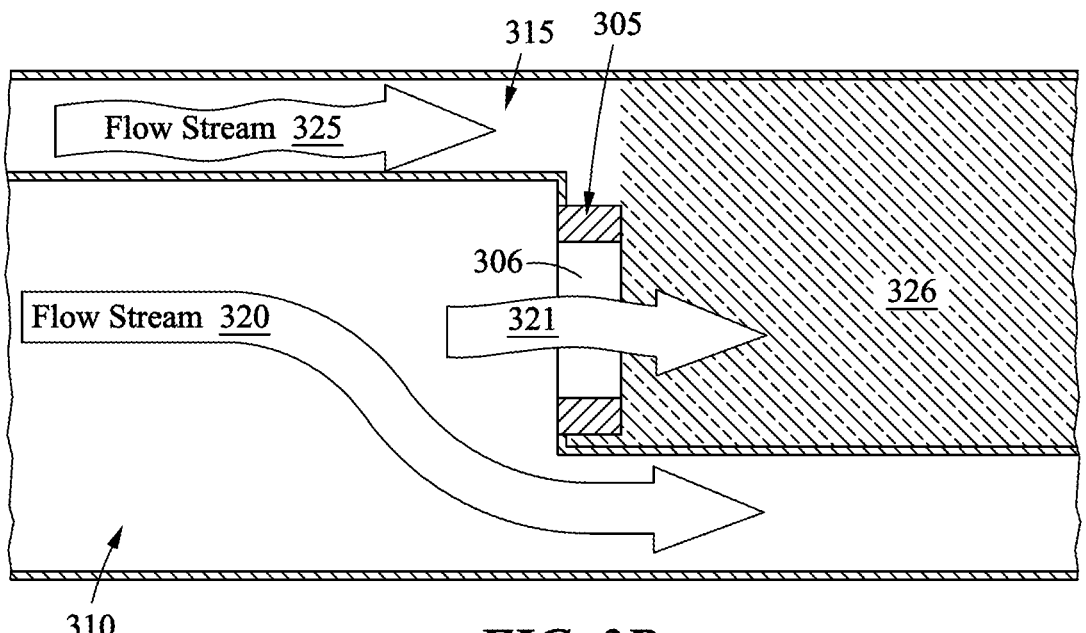

With reference to FIGS. 3A-3B, air modulating system 300 is shown, in accordance with various embodiments. Air modulating system 300 may include at least one air modulating device, such as air modulating device 305, to control air flow and/or pressure from a first conduit 310 to a second conduit 315. Air modulating device 305 may provide air modulation and pressure balancing. In addition, air modulating device 305 may be positioned to a fully open or fully closed positions (i.e., with low air blockage or with high air blockage) to allow for a full seal. Further to fully sealing a port, the air modulating device 305 may provide sealing with very minimal leakage while not inducing swirl into the flow of a heat exchanger when in a partially open state. Air modulating device 305 may also allow for syncing its positional state with the positional state of another air modulating device.

In various embodiments, air modulating device 305 may be located with respect to two air streams; flow stream 320 and flow stream 325. Flow stream 320 may be associated with air flow in first conduit 310, and flow stream 324 may be associated with air flow in second conduit 315. Air modulating device 305 may be employed by system 300 to control air flow and/or pressure of a first stream, such as flow stream 320, and a second stream, such as flow stream 325.

In various embodiments, first conduit 310 may relate to a second stream duct of a gas turbine engine, and second conduit 315 may relate to a third stream duct of a gas turbine engine. First conduit 310 may be associated with output of a compressor. First conduit 310 may also be a bypass duct for the gas turbine engine, such as secondary air of the gas turbine engine. First conduit 310 may further be configured to receive heat from a heat exchanger.

FIG. 3A illustrates air modulating system 300 with air modulating device 305 closed, in accordance with various embodiments. Air modulating device 305 may include a sealing configuration, as discussed herein, and a movable element (e.g., movable element 210) configured to move relative to a port (e.g., port 206) and to seal the port from flow stream 320. The sealing configuration of air modulating system 300 can include a gear drive element configured to position a movable element (e.g., movable element 210).

FIG. 3B illustrates air modulating system 300 with air modulating device 305 in an a full or partially open position, such that port 306 of air modulating device 305 allows at least a portion of flow stream 320, shown as flow stream 321, to flow from conduit 310 into conduit 315. As a result of flow stream 321 passing through port 306 in air modulating device 305, flow stream 321 and flow stream 325 will mix in conduit 315 to form a mixed flow stream 326. The amount of mixing for mixed flow stream 326 may be controlled based on the position of a movable element of air modulating device 305 and based on the amount of air flow allowed by port 306.

Figure 3C:
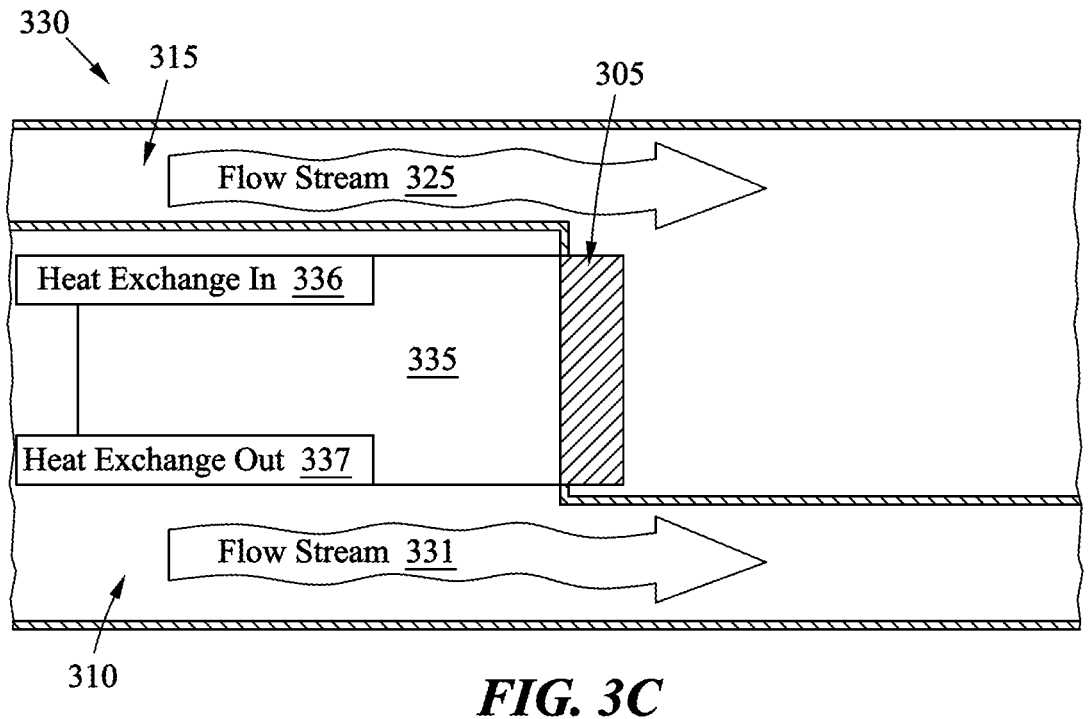
Figure 3D:
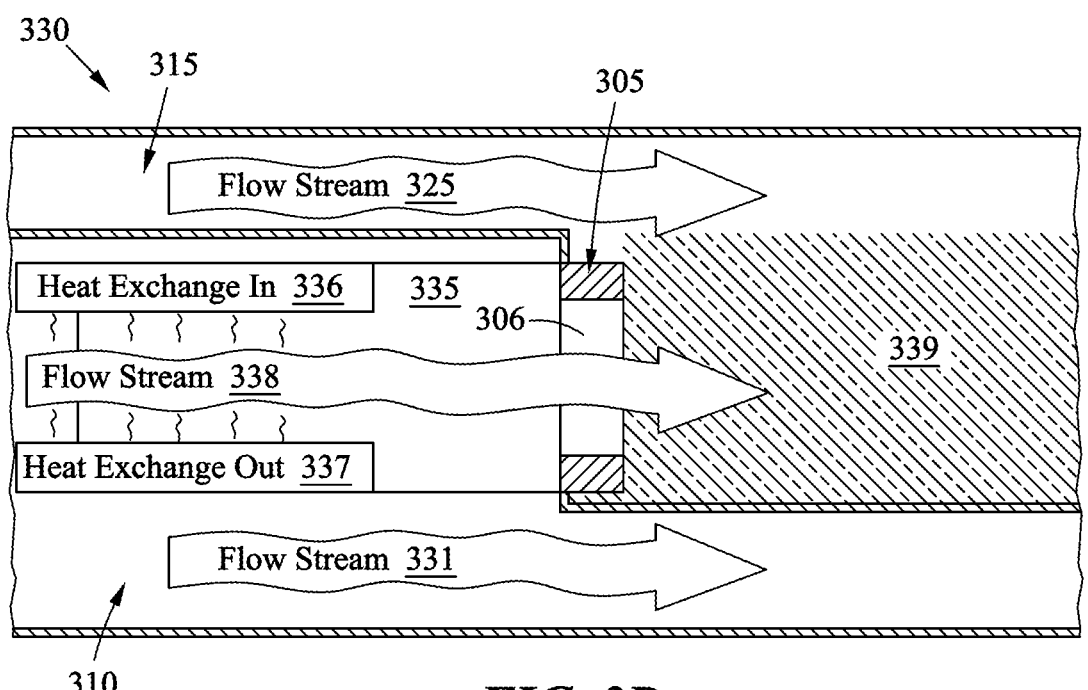

With reference to FIGS. 3C-3D, air modulating system 330 is shown according to various embodiments. Air modulating system 330 relates to a similar configuration of air modulating system 300 to that shown in FIGS. 3A-3B with the addition of heat exchanger 335. FIGS. 3C-3D depict two air flow streams; flow stream 331 and flow stream 325. Flow stream 331 may be associated with air flow in first conduit 310, and flow stream 325 may be associated with air flow in second conduit 315. Air modulating device 305 may be employed by system 330 to control air flow and/or pressure of a first stream, such as flow stream 331, and a second stream, such as flow stream 335.

In various embodiments, air modulating device 305 may be configured to control air in association with a heat exchanger 335. Heat exchanger 335 is shown with inlet 336 configured to receive air (e.g., hot air, bypass air of a gas turbine engine, etc.), and includes heat exchanger outlet 337. The temperature of heat exchanger outlet 337 may be employed to control air modulating device 305.

FIG. 3C illustrates air modulating system 330 with air modulating device 305 closed, in accordance with various embodiments. As a result, flow stream 331 bypasses heat exchanger 335. FIG. 3D shows air modulating system 330 with air modulating device 305 in an open position, such that port 306 of air modulating device 305 allows at least a portion of flow stream 331, the portion shown as 338, to flow from conduit 310 into conduit 315. As a result of flow stream 338 passing through port 306 in air modulating device 305. Flow stream 338 and flow stream 325 will mix in conduit 315 to form a mixed flow stream 339. The amount of mixing for mixed flow stream 339 may be controlled based on the position of a movable element of air modulating device 305 and based on the amount of air flow allowed by port 306.

In various embodiments, air is run through heat exchanger 335 to heat exchanger outlet 337. Air, as shown by flow stream 338, in first conduit 310 may be run over heat exchanger 335 to control the amount of heated flow to second conduit 315. To provide a particular heat exchanger output flow, a door or movable element of air modulating device 305 may be opened or closed. By running the first conduit 310 over the heat exchanger 335, the amount of heated flow may be controlled. Closed loop temperature measurements at the exit of the heat exchanger may result in increasing the opening and/or closing amount of port 306 of air modulating device 305.

Figure 3E:
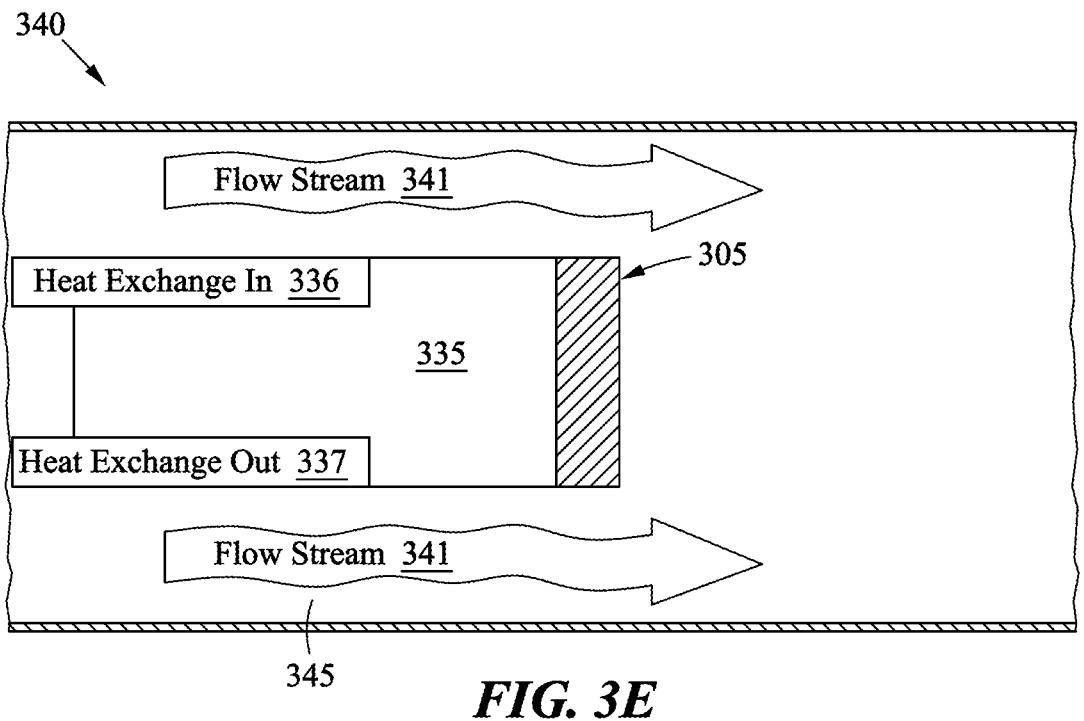
Figure 3F:
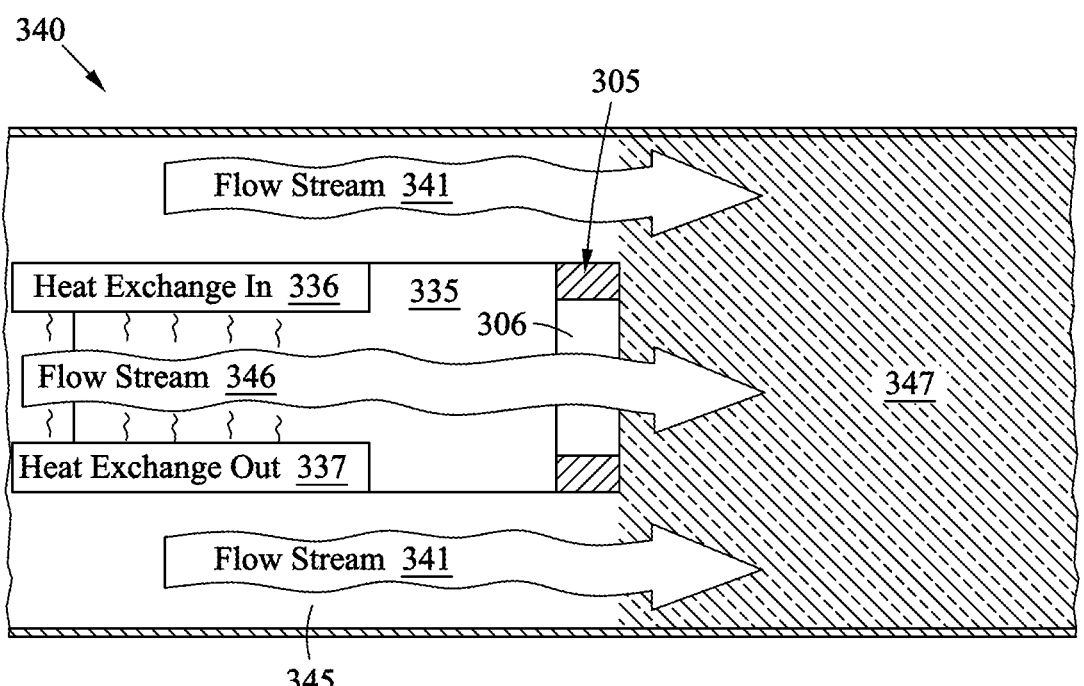

With reference to FIGS. 3E-3F, air modulating system 340 is shown according to various embodiments. Air modulating system 340 may include at least one air modulating device, such as air modulating device 305, to control flow through heat exchanger 335 for a single stream, shown as flow stream 341, and/or a single conduit, shown as 345. Similar to FIGS. 3C-3D above, heat exchanger 335 includes heat exchanger inlet port 336 to receive air (e.g., hot air) and heat exchanger outlet 337. Air modulating device 305 may be configured to receive air from a first conduit 345 providing a first airstream, such as flow stream 341, and then deposit the air back into conduit 345 such that air provided to the heat exchanger 335 is deposited back into the same airstream (e.g., first air stream, flow stream 341, etc.) from which it is received.

FIG. 3E illustrates air modulating system 340 closed. As such, flow stream 341 passes through conduit 345 without heat exchange for heat exchanger 335. FIG. 3F shows air modulating system 340 with air modulating device 305 in an open position. As a result, port 306 of air modulating device 305 allows at least a portion of flow stream 341, the portion shown as 346, to flow through heat exchanger 335. As a result of flow stream 346 passing through port 306 in air modulating device 305, flow stream 341 and flow stream 346 will mix in conduit 345 to form a mixed flow stream 347. The amount of mixing for mixed flow stream 347 may be controlled based on the position of a movable element of air modulating device 305 and based on the amount of air flow allowed by port 306.

The air modulating system configurations of FIGS. 3A-3F may employ one or more of the sealing configurations and air modulating devices discussed herein.

Figure 4A:
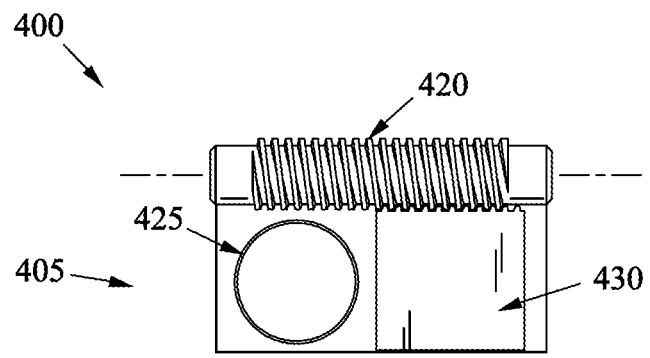
FIGS. 4A-4C depict a graphical representation of air modulating device positions, in accordance with various embodiments.
Figure 4B:
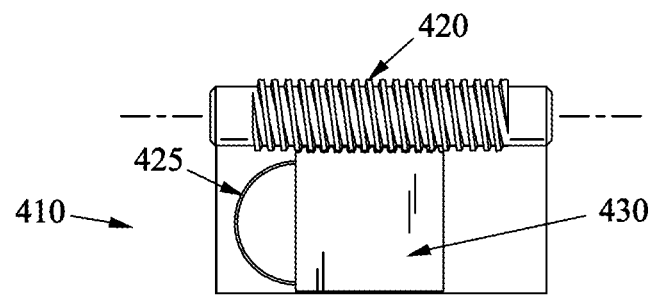
Figure 4C:
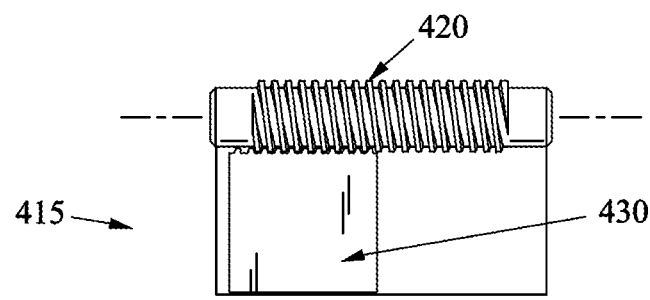

FIGS. 4A-4C depict exemplary positions of a movable element 430 of an air modulating device 400 according to various embodiments. Air modulating device 400 may be controlled to modulate air flow by controlling a movable element 430. FIG. 4A shows movable element 430 in fully open position 405. FIG. 4C shows movable element 430 in a fully closed position 415. Air modulating device 400 may be controlled to modulate air flow by controlling a movable element 430 to positions in between positions 410 and 415, such as partially open position 410 of FIG. 4B. Position 405, position 410 and position 415, and positions in between, such as partially open position 410, are relative to port 425.

In various embodiments, air modulating device 400 may include a drive element 420, shown as a screw drive, and movable element 430, shown as a moving plate. Drive element 420 may be configured to position movable element 430 based on one or more actuator commands and the rotation of drive element 420. Air modulating device 400 may be controlled to modulate air flow by continuously updating the position of movable element 430 relative to a port 425 of the air modulating device. Although partially open position 410 is shown in a particular state in FIG. 4B, the partially open position 410 may relate to any degree or amount of opening between the fully open position 405 and the fully closed position 415. Air modulating device 400 may be configured to control air flow and/or pressure from a first conduit to a second conduit and/or relative to air streams in a gas turbine engine. Air modulating device 400 may be configured to receive air from a first conduit providing a first airstream, and then deposit the air back into another conduit such that air is deposited back into the same airstream (e.g., first air stream). In further embodiments, the air may be deposited by air modulating device 400 into air stream other than the stream from which air is received.

Figure 5B:
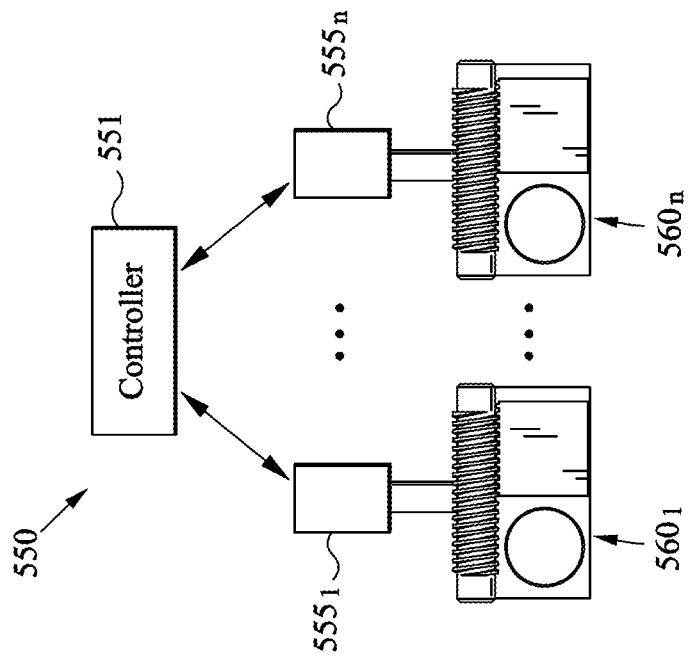
FIG. 5B depicts a graphical representation of a synchronized air modulating system, in accordance with various embodiments.
Figure 5A:
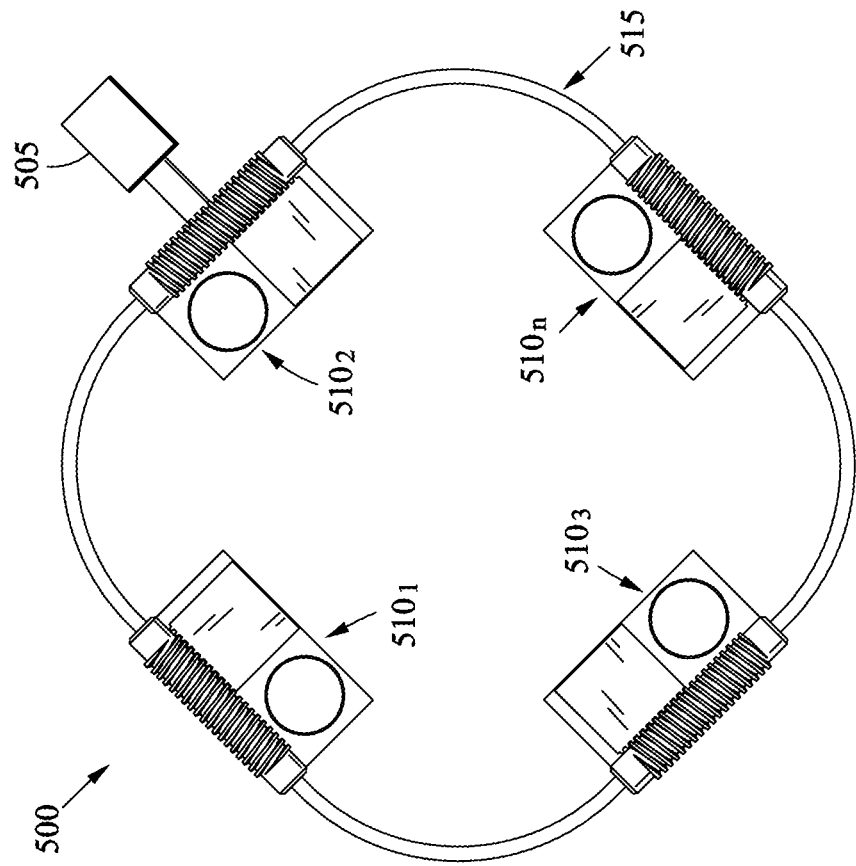
FIG. 5A depicts a graphical representation of a synchronized air modulating system, in accordance with various embodiments.

With reference to FIG. 5A, a synchronized air modulating system is shown according to various embodiments. Air modulating system 500 may employ a plurality of air modulating devices, such as air modulating devices 5101$_n$. According to various embodiments, the air modulating devices 5101$_n$ may be synchronized.

In various embodiments, air modulating system 500 may include actuator 505, air modulating devices 5101-$n$, and a drive shaft 515. In FIG. 5A, all ports (e.g., port 425) are shown as being open. Actuator 505 may be coupled to a control unit and may be configured to operate each of the air modulating devices 5101-$n$ based on commands received from a control unit. Each of air modulating devices 5101-$n$ may be configured with a drive element that may be controlled or positioned by drive shaft 515. Drive shaft 515 may be a flex shaft configured to rotate and drive each air modulating device 5101-$n$. System 500 may beneficially allow for synchronization of each of the air modulating devices 5101-$n$ using a single actuator 505. System 500 includes a control element such as actuator 505 configured to provide continuous control of the movable element position. The control may be configured to synchronize the position of a movable element with the position of one or more additional movable elements of other air modulating devices 5101-$n$.

As used herein, synchronization includes adjusting the position of one or more movable elements to same position with their respective ports. The synchronized air modulating system and sealing configurations discussed herein allow for a single actuator to synchronize a plurality of actuators, such as a ring of actuators, instead of independent actuators for each door. As a result, a series or ring of actuators may be provided by synchronized air modulating system 500 with reduced weight, a smaller package, and fewer penetrations in a duct due to the synchronization. Door synchronization can allow for all doors to be positioned in the same position. Door synchronization can avoid one door being open and one door being closed, which may cause gradients in temperatures.

With reference to FIG. 5B, air modulating system 550 is shown having controller 551, actuators 5551-$n$, and air modulating devices 5601-$n$, in accordance with various embodiments. Actuators 5551-$n$ may be coupled to a control unit 501 and may each be configured to operate a single air modulating device. System 550 may allow for synchronization of each of the air modulating devices 5601-$n$.

FIGS. 6A-6D illustrate sealing configurations according to various embodiments. As will be discussed in more detail below, the sealing configurations may include a moveable element and a drive element. The sealing configurations of FIGS. 6A-6D depict a port configured to receive air from an air flow passage such as a conduit associated with a heat exchanger. Sealing configurations of FIGS. 6A-6D can position a movable element for sealing a port and/or modulating air flow from a first conduit to a second conduit. In that regard, the sealing configurations of FIGS. 6A-6D may be applied to air modulating devices for controlling air flow, air flow modulation, and/or pressure balancing. The sealing configurations for air modulating devices of FIGS. 6A-6D may be configured to control air flow and/or pressure from a first conduit to a second conduit. In that regard, the sealing configurations may provide an air modulating device configured to receive air from a first conduit providing a first airstream (e.g., airstream from which a heat exchanger pulls from), and then deposit the air back into another conduit such that air is deposited back into the same airstream (e.g., first air stream). In further embodiments, the air may be deposited by air modulating device into air stream other than the stream from which air is received. It should also be appreciated that the sealing configurations of FIGS. 6A-6D may be used in other applications.

Figure 6C:
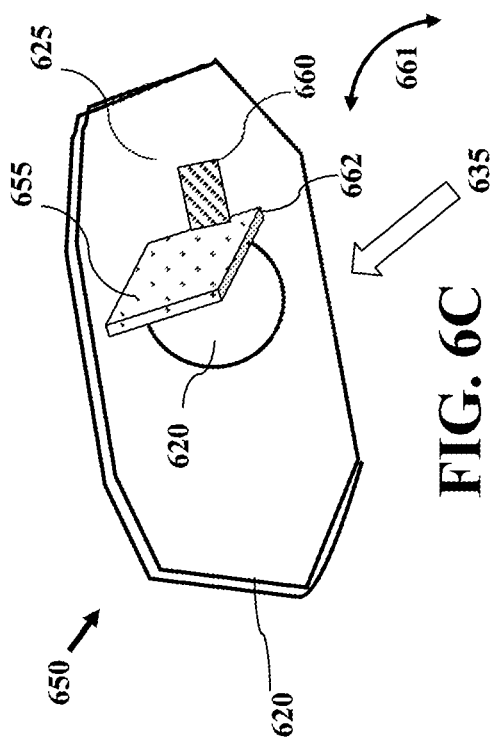
FIGS. 6A-6D depict graphical representations of sealing configurations, in accordance with various embodiments.
Figure 6D:
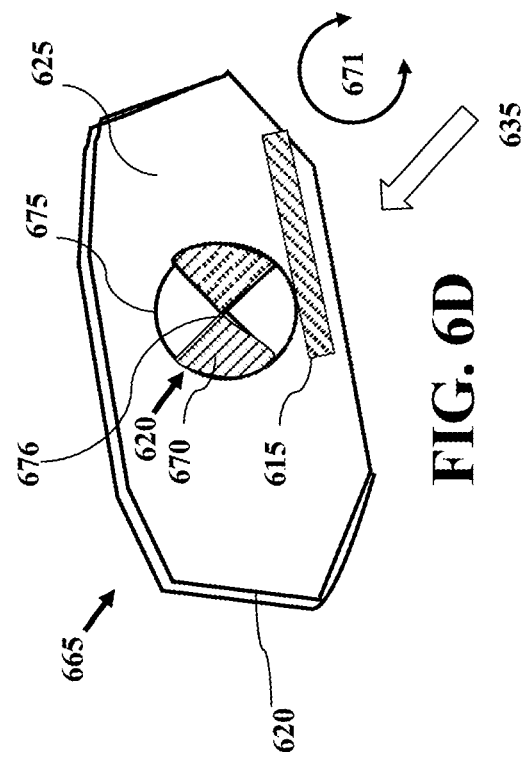
Figure 6A:
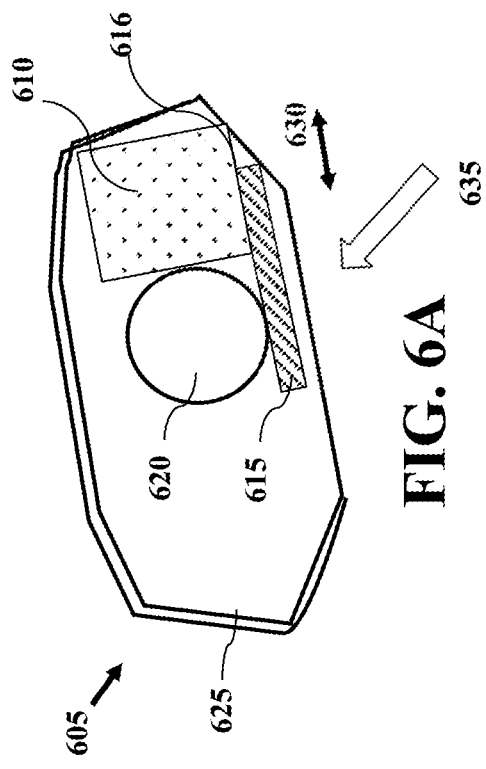
Figure 6B:
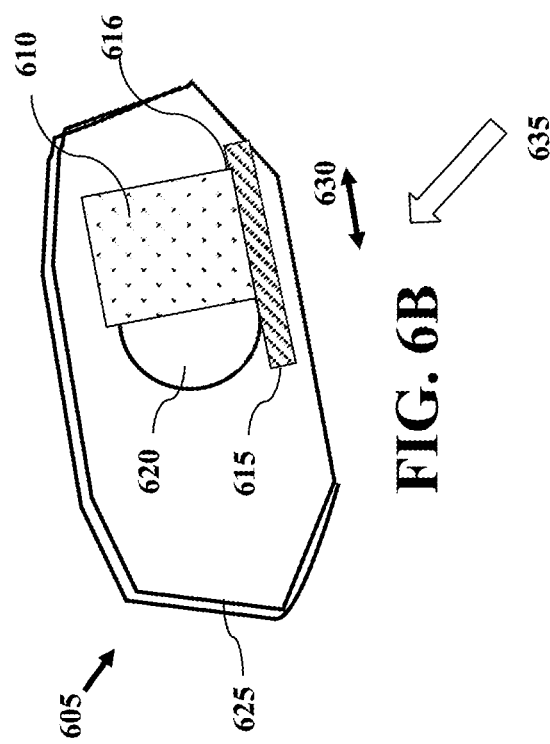

In various embodiments, sealing configurations may include varying types of moveable element to seal a port. FIGS. 6A-6B depict sealing configuration 605 including a moveable element 610 for sealing port 620 and gear drive element 615 for positioning moveable element 610. FIG. 6C depicts movable element 655 for sealing port 620, such that movable element 655 is a hinged type element, such as a hinged plate. FIG. 6D depicts movable element 670 for sealing a port 620, such that movable element 670 is a rotating element.

As shown in FIGS. 6A-6B, and according to various embodiments, moveable element 610 may be a sliding element, such as a plate, configured to slide relative to port 620. Movable element 610 may be positioned by a drive element 615, and movable element 610 may move relative to 620 port and to seal the port 620. The position of movable element 610 may modulate air flow out of port 620, such as the air flow from a first conduit to a second conduit. Air flow received by the port 620 is shown generally as 635. In that regard, movable element 610 and/or drive element 615 may be positioned on the receiving side of air flow 635 (e.g., side 215).

In various embodiments, moveable element 610 may be coupled or engaged with drive element 615 along at least one surface. FIGS. 6A-6B depict bottom surface 616 of movable element 610 as engaged with drive element 615 to control linear position of movable element 610. Drive element 615 may be a gear drive element including one or more teeth or ridges configured to engage with bottom surface 616. Bottom surface 616 may include one or more features, such as deformations, ridges, etc. In that fashion, drive element 615 may be configured to retain and/or position movable element 610 based on the interconnection with bottom surface 616. Although movable element 610 is shown as being positioned above drive element 615 and drive element is positioned below port 620, it should be appreciated that the position of movable element 610 and drive element 615 may be modified or rearranged according to various. By way of example, drive element 615 may be positioned horizontally or vertically to position moveable element 610.

Moveable element 610 is shown as a square plate but may have other shapes. The shape of moveable element 610 may correspond with or match the shape of port 620. In other embodiments, the shape of moveable element 610 may differ than the shape of port 620. For example, moveable element 610 may have a square shape and port 620 may have a circular opening.

In various embodiments, drive element 615 may be a linear element configured to control the linear position of moveable element 610 relative to the axis of drive element 615 to control linear position shown as 630 with respect to port 620. Drive element 615 may be a gear drive element including one or more gear features such rotation of the drive element 615 positions movable element 610. Positioning of movable element 610 may modulate the output of air flow 635 out of port 620, such as from a first conduit to a second conduit. Positioning of movable element 610 may modulate the output of air flow 635 and seal port 620. Gear drive element 615 may be controlled by an actuator (e.g., actuator 505). Drive element 615 may be synchronized with the position of another gear drive element. Movable element 610 may controlled to modulate air flow 635, or similarly air flow through port 620, based on the positioning of movable element 610 with respect to port 620 along direction 630.

Positioning of movable element 610 may modulate air and/or balance pressure. Drive element 615 may be configured to position movable element 610 to a fully open, fully closed and one or more partially covered positions with respect to port 620. FIG. 6A depicts an exemplary fully open position for movable element 610. Drive element 615 may be configured to provide linear control and allow for positioning of movable element 610 to a partially covered position of port 620 as shown in FIG. 6B. The position of movable element 610 can slide back and forth as shown by direction 630 to allow for movable element 610 to fully close and seal port 620, such as a fully covered position (e.g., fully closed 415).

In various embodiments, port 620 may be a passageway in a structure 625 of the gas turbine engine, such as a casing, bulkhead or wall, for receiving air flow (e.g., bypass air flow, secondary air flow, etc.). Port 620 may be associated with, and receive air from, a first conduit (e.g., first conduit 315) associated with a heat exchanger (e.g., heat exchanger 325). Movable element 610 may be configured to seal port 620 from air flow 635 which may be secondary air flow or air flow received from a first conduit associated with a heat exchanger. Port 620 is shown as a circular opening but may have other shapes, such as a square opening, non-circular, etc.

FIG. 6C depicts a sealing configuration 650 including movable element 655 for sealing port 620 according to various embodiments. Movable element 655 in FIG. 6C may be a hinged type element such as a hinged plate. Movable element 655 may relate to a plate or door that flips open (e.g., up) or closed (e.g., down) in response to drive element 660. Similar to the control of the movable element 610 in FIGS. 6A-6B, movable element 655 in FIG. 6C may be positioned relative to port 620 for sealing and/or air modulation. Movable element 655, however, may be rotated in contrast to the linear positioning in FIGS. 6A-6B. By way of example, movable element 655 may be rotated in a direction shown by 661 relative to hinge 662. Thus, movable element 655 may be a hinged plate configured to rotate relative to an axis of hinge 662 adjacent port 620. In that fashion, movable element 655 may swing out from the surface of structure 625 to provide a path for air flow 635 into port 620. Movable element 655 may also swing towards the surface of structure 625 to seal port 620 from air flow 635. Rotation of movable element 655 may shield parts from added flow. In certain embodiments, rotation of movable element 655 may not induce swirl into the flow of port 620. Drive element 660 may be a gear drive element, wherein rotation of drive element 660 controls the rotation of movable element 655. Movable element 655 is shown as a square plate, but may be other shapes.

FIG. 6D depicts a sealing configuration 665 including movable element 670 for sealing port 620, in accordance with various embodiments. Movable element 670 may be a rotating element, for example. Movable element 670 may include one or more openings 675 providing at least one air flow path in port 620 in response to rotation of the movable element relative to the port 620. Openings 675 may be sized to match openings in port 620 or may differ in size and shape. Openings 675 may be triangular shaped elements such as semi-circular or quarter circular elements.

In various embodiments, movable element 670 may be a rolling element or rolling door, such that drive element rotation 615 rotates movable element 670 in direction 671 relative to axis 676. Rotation of movable element 670 may change the position of openings 675 and uncover a portion of port 620. In one exemplary embodiment, movable element 670 may be a door with holes or passages. Movable element 670 as a rotational element may reduce the amount of moving parts of a sealing configuration. Exemplary representations of a rotational movable element, such as movable element 670, are shown in FIGS. 7A-7C.

Figure 7C:
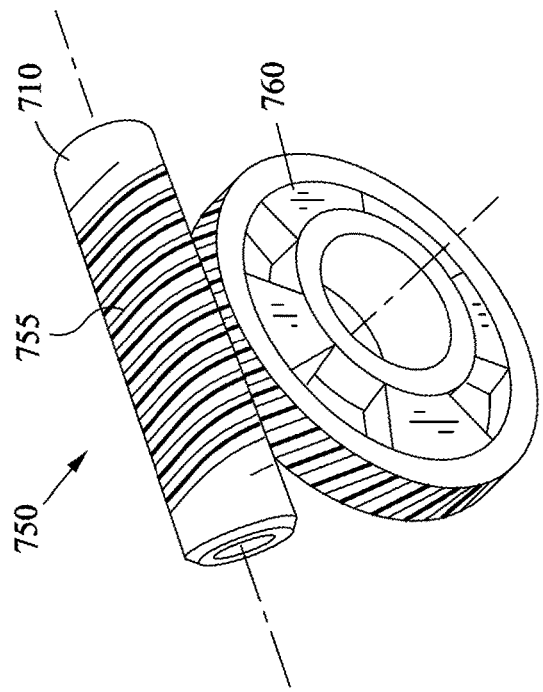
FIGS. 7A-7C depict graphical representations of sealing configurations, in accordance with various embodiments.
Figure 7A:
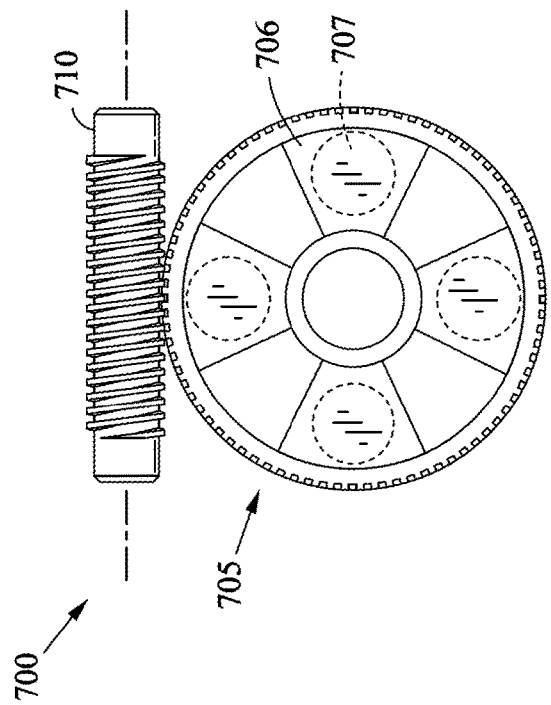
Figure 7B:
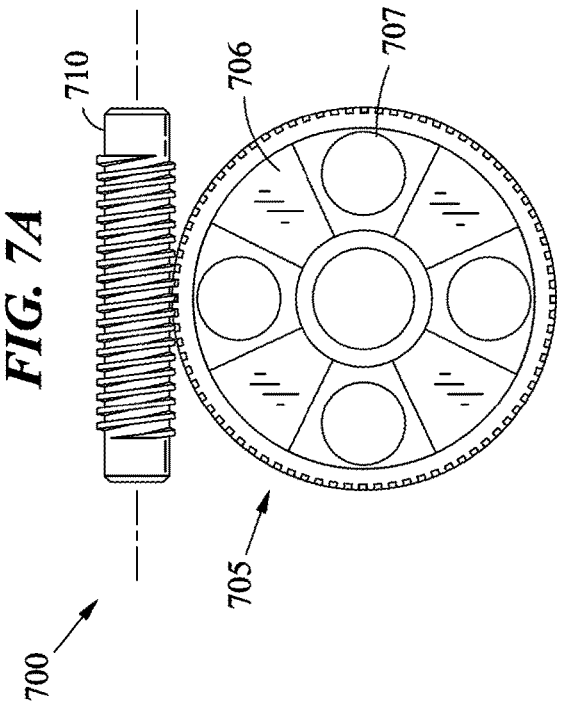

With reference to FIGS. 7A-7C, sealing configurations are shown according various embodiments. FIG. 7A depicts sealing configuration 700 having movable element 705 and drive element 710. Movable element 705 may be a rotating element, wherein rotation of drive element 710 rotates movable element 705 and one or more blades 706. Movable element 705 may cover a port. Rotation of movable element 705 may allow for blades 706 to open or uncover one or more openings in the movable element and/or port.

In various embodiments, FIG. 7B shows sealing configuration 700 with blades 706 rotated. Rotation of movable element 705 may expose openings 707. As such, FIG. 7A depicts sealing configuration 700 with moveable element in a closed position, and FIG. 7B depicts sealing configuration 700 in an open position.

FIG. 7C illustrates a three-dimensional representation 750 of components of sealing configuration 700 including drive element 710 and rotational element 760. Drive element 710 may be a worm gear having a plurality of ridges 755, which may interface with teeth of rotational element 760. Rotational element 760 may be a movable element 705 and may be positioned based on rotation of drive element 710. Rotational element 760 may be a movable element for covering a port of an air modulating device.

The sealing configurations of FIGS. 7A-7C may be applied to air modulating devices for controlling air flow, air flow modulation, and/or pressure balancing. It should also be appreciated that the sealing configurations of FIGS. 7A-7C may be provided for other applications.

Figure 8:
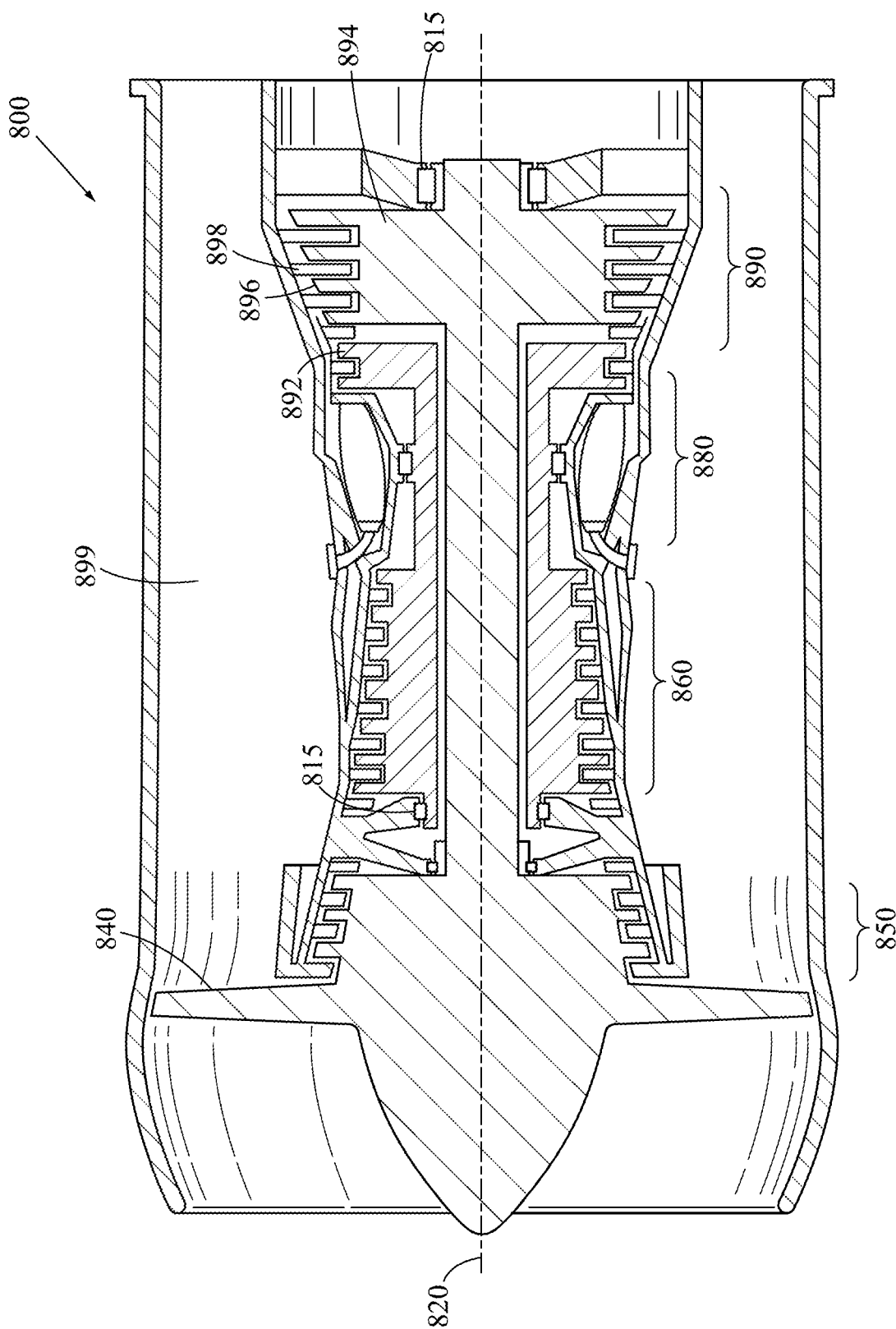
FIG. 8 illustrates a cross-sectional view of an exemplary gas turbine engine, in accordance with various embodiments.

Referring to FIG. 8, a gas turbine engine 800 (such as a turbofan gas turbine engine) is illustrated according to various embodiments. Gas turbine engine 800 is disposed about axial centerline axis 820, which may also be referred to as axis of rotation 820. Gas turbine engine 800 may comprise a fan 840, compressor sections 850 and 860, a combustion section 880, and a turbine section 890. Air compressed in compressor sections 850, 860 may be mixed with fuel and burned in combustion section 880 and expanded across turbine section 890. Turbine section 890 may include high-pressure rotors 892 and low-pressure rotors 894, which rotate in response to the expansion. Turbine section 890 may comprise alternating rows of rotary airfoils or blades 896 and static airfoils or vanes 898. A plurality of bearings 815 may support spools in the gas turbine engine 800.

In various embodiments, dynamic sealing may be used to modulate pressure driven gas-flow systems in gas turbine engine 800. For example, a secondary or bypass flow may flow through passage 899, which may be disposed radially outward from compressor sections 850 and 860, combustion section 880, and turbine section 890. Passage 899 may benefit from dynamic sealing to modulate air flow through passage 899. FIG. 8 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 800 lie along axis of rotation 820. For example, fan 840 may be referred to as forward of turbine section 890 and turbine section 890 may be referred to as aft of fan 840. Typically, during operation of gas turbine engine 800, air flows from forward to aft, for example, from fan 840 to turbine section 890. As air flows from fan 840 to the more aft components of gas turbine engine 800, axis of rotation 820 may also generally define the direction of the air stream flow.

Figure 9:
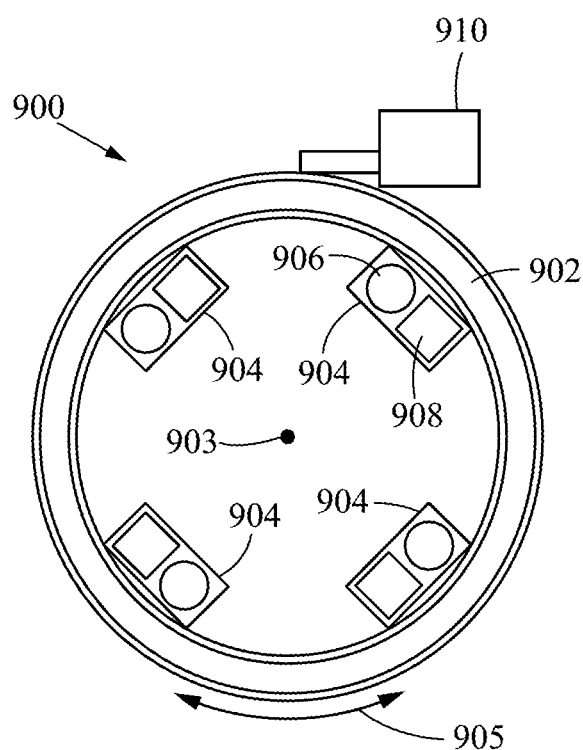
FIG. 9 illustrates a synchronized air modulating system with a sync ring and multiple seals, in accordance with various embodiments.

FIG. 9 illustrates an exemplary synchronized air modulating system with a sync ring and multiple seals, in accordance with various embodiments. Air modulating system 900 may include sync ring 902. Sync ring 902 may be coupled to seal doors 908 and may rotate circumferentially around center point 903 in direction 905 to move seal doors 908. Seal doors 908 may be configured to slideably engage seal wall 904 and move across a surface of seal wall 904. Seal wall 904 defines passage 906. The passage 906 defined by seal wall 904 may be similar to and/or the same as the passages described above with reference to FIGS. 1-7. Similarly, seal doors 908 may be similar to or the same as the movable elements described above with reference to FIGS. 1-7.

In various embodiments, passage 906 may be opened or closed by rotating sync ring 902 and sliding seal doors 908 over passage 906. Actuator 910 may be coupled to sync ring 902 to circumferentially rotate sync ring 902. Actuator 910 may be a part of a drive element as described with reference to FIGS. 1-7 above and a drive element may also include an actuator. By circumferentially rotating sync ring 902, actuator 910 may move seal doors 908 into open, partially open, or closed positions. A second actuator 910 may be added for purposes of redundancy. Sync ring 902 and actuator 910 synchronize control of multiple seals and reduce space requirements by eliminating the need to have an actuator for each seal.

FIG. 10A illustrates further detail of the seal components of FIG. 9 with seal door 908 in a fully open position, in accordance with various embodiments. Passage 906 is completely uninhibited by seal door 908 to maximize gas flow through passage 906. Seal door 908 may be slid away from passage 906 as sync ring 902 rotates circumferentially. Seal door 908 may leave passage 906 completely uncovered to maximize airflow through passage 906.

FIG. 10B illustrates further detail of the seal components of FIG. 9 with seal door 908 in a partially closed position, in accordance with various embodiments. Passage 906 may be partially blocked by seal door 908. Seal door 908 may be slid partially over passage 906 as sync ring 902 rotates circumferentially. Seal door 908 may be positioned at any point partially covering passage 906 to throttle air flow through passage 906 of seal wall 904. Seal door 908 may provide linear flow control in response to the partially opened state of seal door 908.

Figure 10C:
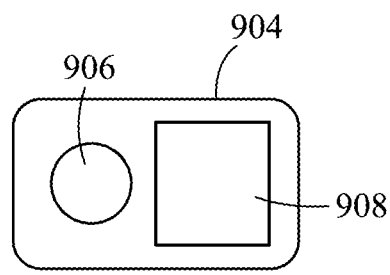
FIG. 10C illustrates a seal with a seal door in a closed position, in accordance with various embodiments.
Figure 10C:
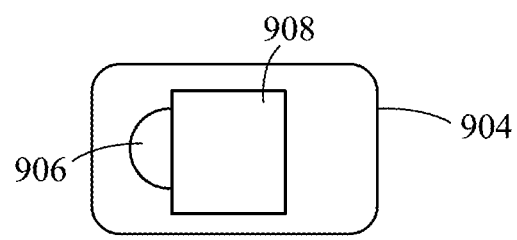
Figure 10C:
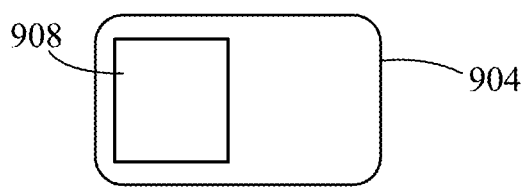

FIG. 10C illustrates further detail of the seal components of FIG. 9 with seal door 908 in a fully closed position, in accordance with various embodiments. Passage 906 may be completely blocked by seal door 908. Seal door 908 may be slid completely over passage 906 as sync ring 902 rotates circumferentially. Seal door 908 may be positioned over passage 906 to substantially stop air flow through passage 906 of seal wall 904. Seal door 908 may provide improved sealing with minimal air leakage through passage 906.

Figure 10D:
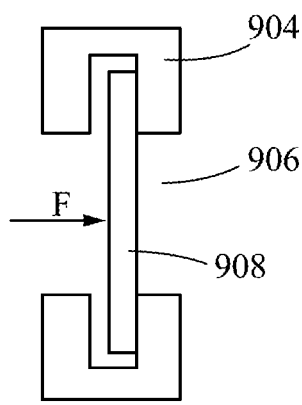
FIG. 10D illustrates a cross sectional view of seal in a closed position with a pressure differential forcing a seal door into a seal wall, in accordance with various embodiments.

FIG. 10D illustrates a cross-sectional view of a seal in a fully closed position with a pressure differential pressing against one side of seal door 908, in accordance with various embodiments. Seal wall 904 may comprise passage 906 with seal door 908 completely covering passage 906. The forward side of seal door 908 is subjected to increased air pressure as airflow is no longer able to pass freely through passage 906. The aft side of seal door 908 exposed from seal wall 904 by passage 906 may be subjected to lower pressure air than the forward side of seal door 908. The pressure differential between the aft side of seal door 908 and the forward side of seal door 908 forces seal door 908 against seal wall 904. The force F pressing seal door 908 against seal wall 904 as a result of the pressure differential improves sealing between seal door 908 and seal wall 904. Air flow between seal door 908 and seal wall 904 is substantially prevented as seal door 908 completely covers passage 906 and the pressure differential increases seal efficiency between seal door 908 and seal wall 904. Seal wall 904 and seal door 908 may be made of a rigid material to resist deformation in the face of force F. For example, in high temperature applications, seal wall 904 and seal door 908 may be made of a high performance nickel-chromium alloy such as an austenitic nickel-chromium-based superalloy (e.g., a material available under the trademark INCONEL).

Figure 11:
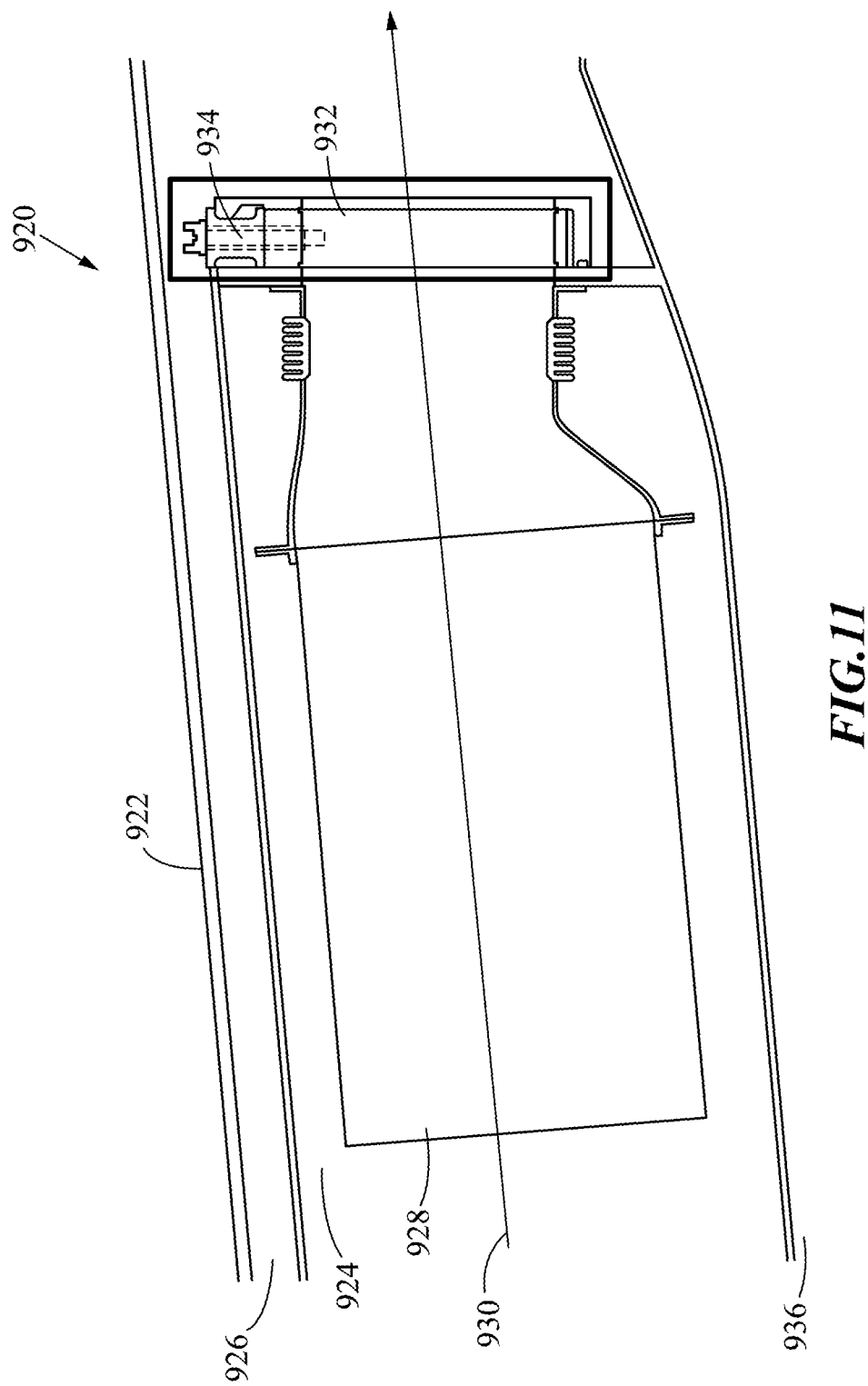
FIG. 11 illustrates a partial cross section of a gas turbine engine with a seal to block a secondary flow path, in accordance with various embodiments.

FIG. 11 illustrates a partial cross section of a gas turbine engine with a seal to block off a secondary flow path, in accordance with various embodiments. Gas turbine engine 920 (similar to gas turbine engine 800 in FIG. 8) includes outer case 922. Bypass air flow of gas turbine engine 920 flows in second stream duct 924 and third stream duct 926 in flow direction 930. For example, second stream duct and third stream duct may be located in a passage of gas turbine engine 920 similar to passage 899 of FIG. 8. A primary flow path 936 may be radially inward from second stream duct 924 and third stream duct 926. Heat exchanger 928 may be in second stream duct 924. Air flow in second stream duct may be directed into heat exchanger 928. Seal 934 manages air flow at an exit port 932 of heat exchanger 928. Seal 934 may also be placed at an intake of heat exchanger 928 to manage air flow through heat exchanger 928 and second stream duct 924. Seal 934 may also be placed in third stream duct 926 absent a heat exchanger to manage air flow through third stream duct 926. Seal 934 may be used to manage air flow through any duct or flow path in a gas turbine engine.

Figure 12A:
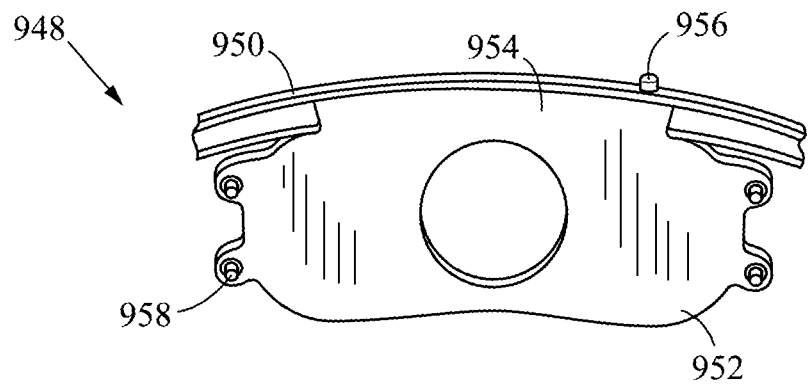
FIG. 12A illustrates a seal with a sliding door and sync ring viewed from aft to forward, in accordance with various embodiments.

FIG. 12A illustrates a seal 948 with a sliding door and sync ring viewed from aft to forward, in accordance with various embodiments. Seal 948 may function as described with respect to air modulating system 900 from FIG. 9. Sync ring 950 may be visible from the aft side and need not be fastened to seal wall 952, as sync ring 950 may rotate circumferentially relative to seal wall 952. Sync ring 950 may be made of a high performance nickel-chromium alloy such as an austenitic nickel-chromium-based superalloy (e.g., a material available under the trademark INCONEL) or a titanium alloy for reduced weight and cost. Seal 948 includes a seal wall 952 to direct air flow to passage 954 defined by seal wall 952. Seal wall 952 may be coupled to a heat exchanger, for example, using fastener 958. Fastener 958 may include rivets, bolts, welds, or other means of fastening. Thus, air flowing through a heat exchanger, for example, may be controlled at passage 954. Seal wall 952 may be made of a high performance nickel-chromium alloy such as an austenitic nickel-chromium-based superalloy.

Figure 12B:
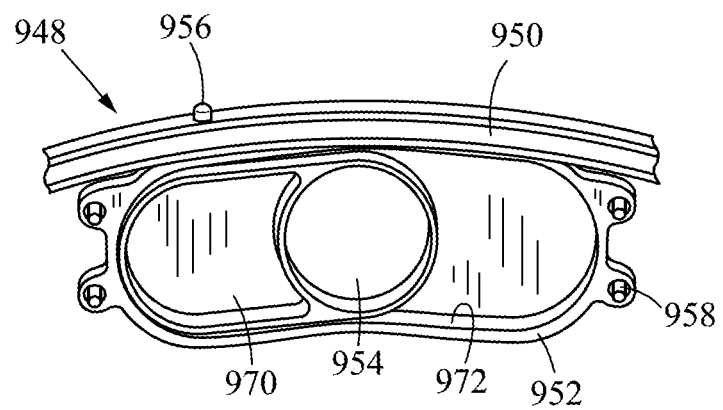
FIG. 12B illustrates a seal with a sliding door and sync ring viewed from forward to aft, in accordance with various embodiments.

FIG. 12B illustrates a seal 948 with a seal door 970 and sync ring viewed from forward to aft, in accordance with various embodiments. Sync ring 950 may be coupled to seal door 970 by fastener 956. Seal door 970 may be made of a high performance nickel-chromium alloy such as an austenitic nickel-chromium-based superalloy. Seal wall 952 includes ridge or track 972 to slideably engage seal door 970 and maintain seal door 970 traveling along a desired path in response to sync ring 950 rotating circumferentially. As sync ring 950 rotates clockwise as viewed in FIG. 12B, seal door 970 slides along track 972 in a direction tangential to the rotational motion while pressed against seal wall 952 to at least partially cover passage 954 and restrict air flow.

Figure 12C:
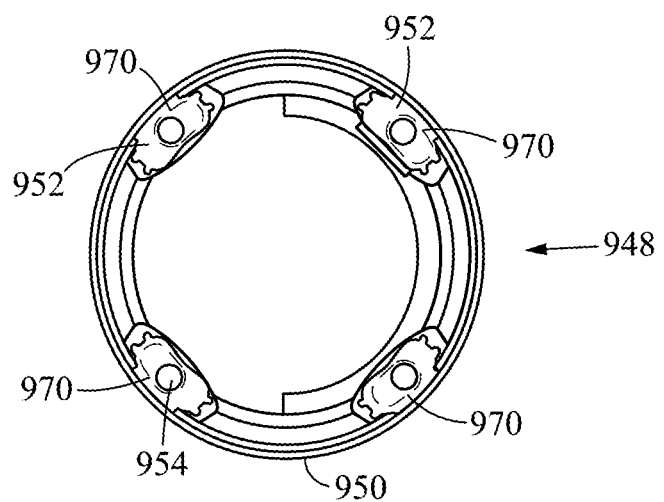
FIG. 12C illustrates a seal with multiple sliding doors attached to a sync ring, in accordance with various embodiments.

FIG. 12C illustrates a seal 948 with multiple sliding doors attached to a sync ring viewed from aft to forward, in accordance with various embodiments. Sync ring 950 may be connected to multiple seal doors 970 to move all connected seal doors 970 at the same rate and to the same positions relative to respective seal walls 952. Thus, sync ring 950 tends to synchronize the motion of a plurality of seal doors 970 and the open, closed, or partially closed state of seals 948. Seals 948 leverage a gas pressure differential across sides of seal door 970 to substantially close off air flow through passage 954.

Figure 13A:
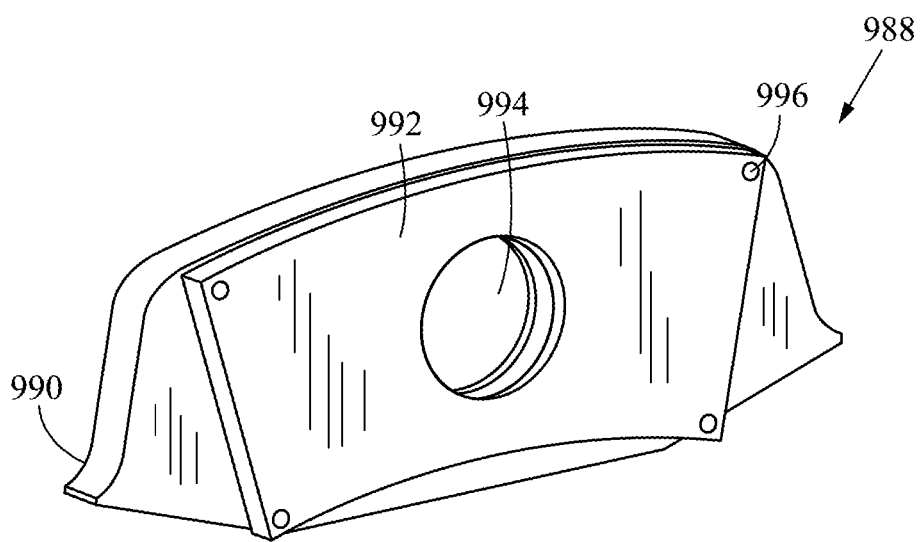
FIG. 13A illustrates a seal with a rolling door viewed from aft to forward, in accordance with various embodiments.

FIG. 13A illustrates a seal 988 with a rolling door and sync ring viewed from aft to forward, in accordance with various embodiments. Seal 988 may function as described with respect to air modulating system 900 from FIG. 9. Seal 988 includes a seal wall 992 to direct air flow to passage 994 defined by seal wall 992. Seal wall 992 may be made of a high performance nickel-chromium alloy such as an austenitic nickel-chromium-based superalloy. Seal wall 992 may be coupled to a surface 990, for example, using fastener 996. Fastener 996 may include rivets, bolts, welds, or other means of fastening. Surface 990 may be a wall of a heat exchanger. Thus, air flowing through a heat exchanger, for example, may be controlled at passage 994.

Figure 13B:
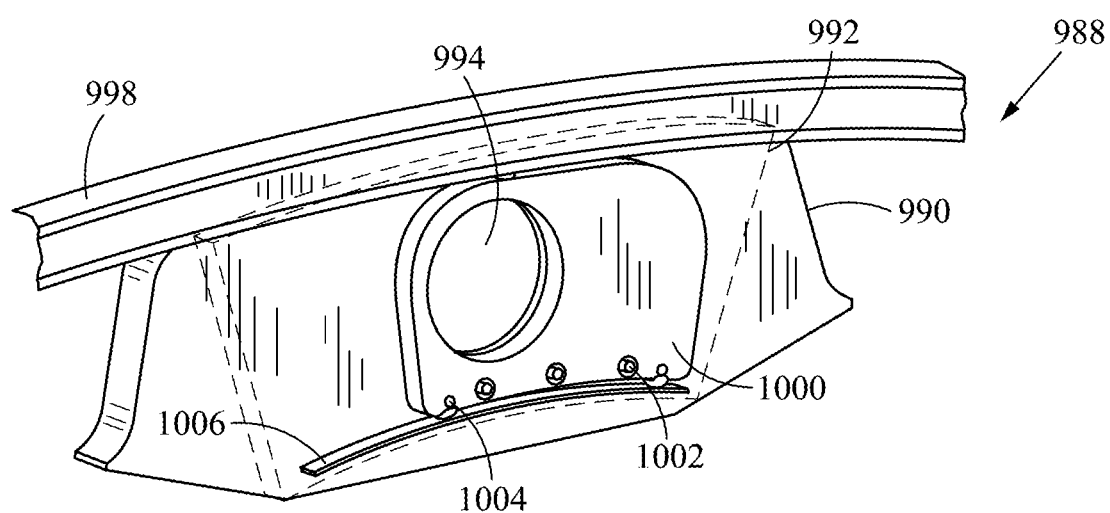
FIG. 13B illustrates a seal with a rolling door and sync ring viewed from forward to aft, in accordance with various embodiments.

FIG. 13B illustrates a seal 988 with a seal door 1000 and sync ring 998 viewed from forward to aft, in accordance with various embodiments. Sync ring 998 may be coupled to seal door 1000 by a fastener. Seal door 1000 may be made of a high performance nickel-chromium alloy such as an austenitic nickel-chromium-based superalloy. Seal wall 992 includes ridge or track 1006 to engage rollers 1004 of seal door 1000 and maintain seal door 1000 traveling along a desired path in response to sync ring 998 rotating circumferentially. Rollers 1004 of seal door 1000 may include a cobalt and/or cobalt alloy axle and cobalt and/or cobalt alloy wheel to promote smooth rolling at high temperatures. Rollers 1004 may be fixed to seal door 1000 using fasteners 1002. As sync ring 998 rotates clockwise as viewed in FIG. 13B, seal door 1000 rolls laterally along track 1006 in a direction tangential to the circumferential rotation of sync ring 998. Seal door 1000 may be pressed against seal wall 992 to at least partially cover passage 994 and restrict air flow.

Figure 13C:
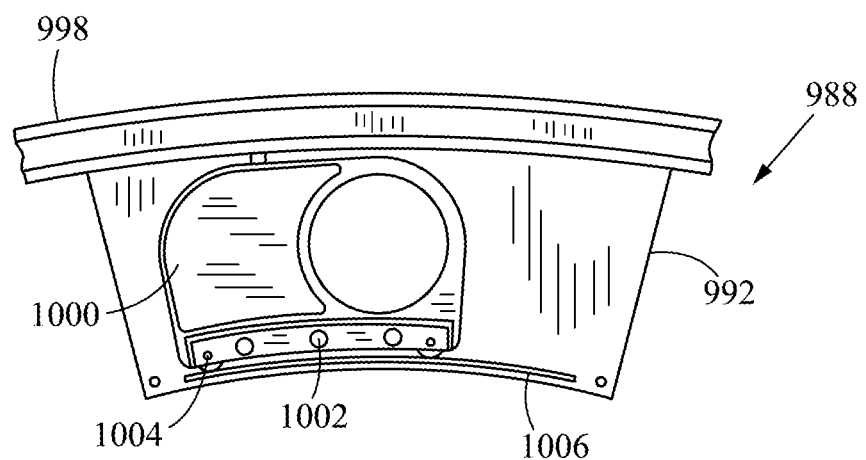
FIG. 13C illustrates a seal with a rolling door and sync ring, in accordance with various embodiments.

FIG. 13C illustrates a seal 988 with a rolling door 1000 and sync ring 998, in accordance with various embodiments. Sync ring 998 may be connected to multiple seal doors 1000 to move all connected seal doors 1000 at the same rate and to the same positions relative to respective seal walls 992. Thus, sync ring 998 tends to synchronize the motion of a plurality of seal doors 1000 and the open, closed, or partially closed state of seals 988. Seals 988 leverage a gas pressure differential across sides of seal door 1000 to substantially close off air flow through passage 994.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for modulating air flow in a gas turbine engine, comprising:
   a seal wall comprising an opening;
   a seal door configured to sealably and slideably engage the seal wall;
   an actuator configured to move the seal door over the opening, wherein the seal door is forward of the seal wall and is configured to press against the seal wall in response to a pressure differential between an aft side of the seal door and a forward side of the seal door in response to the seal door covering the opening;
   a track under the seal door; and
   a sync ring coupled to the seal door, wherein the seal door slides along the track in response to the sync ring rotating circumferentially.

2. The system of claim 1, further comprising a surface forward of the seal door, wherein the seal door is configured to seal a passage through the surface and the opening of the seal wall.

3. The system of claim 1, wherein the seal door slides in a direction tangential to the rotation of the sync ring.

4. The system of claim 3, wherein the track comprises cobalt.

5. The system of claim 3, further comprising rollers coupled to the seal door,
   wherein the rollers are on the track.

6. The system of claim 1, wherein the seal door comprises a nickel-chromium alloy.

7. The system of claim 1, wherein the actuator is coupled through the sync ring to the seal door.

* * * * *